(12) United States Patent
Corley et al.

(10) Patent No.: US 8,453,827 B2
(45) Date of Patent: Jun. 4, 2013

(54) MODULAR PLASTIC SPIRAL BELT

(75) Inventors: Andrew A. Corley, Harahan, LA (US);
Daryl J. Marse, New Orleans, LA (US);
Dax Wilson-Boyer, Metairie, LA (US);
Philip J. Wunsch, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 121 days.

(21) Appl. No.: 13/123,640

(22) PCT Filed: Oct. 28, 2009

(86) PCT No.: PCT/US2009/062324
§ 371 (c)(1),
(2), (4) Date: Aug. 8, 2011

(87) PCT Pub. No.: WO2010/053773
PCT Pub. Date: May 14, 2010

(65) Prior Publication Data
US 2012/0125742 A1   May 24, 2012

Related U.S. Application Data

(60) Provisional application No. 61/112,354, filed on Nov. 7, 2008.

(51) Int. Cl.
*B65G 13/02* (2006.01)
(52) U.S. Cl.
USPC .......................................... 198/778; 198/853

(58) Field of Classification Search
USPC .......................................... 198/778, 850, 853
See application file for complete search history.

(56) References Cited

U.S. PATENT DOCUMENTS

| | | | | |
|---|---|---|---|---|
| 4,981,208 | A * | 1/1991 | Jones ............................ | 198/778 |
| 5,358,096 | A * | 10/1994 | Faulkner et al. .............. | 198/778 |
| 5,431,275 | A * | 7/1995 | Faulkner ....................... | 198/853 |
| 5,921,379 | A * | 7/1999 | Horton .......................... | 198/852 |
| 7,070,043 | B1 * | 7/2006 | MacLachlan et al. ........ | 198/853 |
| 7,891,481 | B2 * | 2/2011 | Pressler et al. ............... | 198/779 |
| 8,083,053 | B2 * | 12/2011 | Paardekooper et al. ...... | 198/853 |
| 2009/0266682 | A1 | 10/2009 | Eisner | |

* cited by examiner

Primary Examiner — James R Bidwell
(74) Attorney, Agent, or Firm — James T. Cronvich

(57) ABSTRACT

A modular spiral belt and method for molding belt modules for constructing a heat-resistant belt. The spiral belt is constructed of a series of hingedly interconnected belt modules. The modules have single hinge links at the outside of a turn and dual hinge links elsewhere. All the hinge links extend outward from opposite faces of a central transverse spine. The dual hinge links, which each have a pair of parallel legs joined at a distal end by a yoke, are separated by a transverse pitch greater than the transverse pitch of the single one-legged hinge links at the outside of a turn. When molded from a blend of a thermoplastic polymer and a nanoclay, belt modules are useful in heat-resistant applications without sacrificing beam stiffness.

20 Claims, 4 Drawing Sheets

MODULAR PLASTIC SPIRAL BELT

BACKGROUND

The invention relates generally to power-driven conveyors and, more particularly, to modular plastic conveyor belts suitable for following curved paths.

Many conveying applications require conveyor belts to transport articles along curved paths. In low-tension spiral conveyors, for example, a conveyor belt is wrapped helically around a cylindrical drive tower in a compact arrangement for use inside a freezer, on a cooling line, or in a proofer. Conventionally, metal conveyor belts have been used with spiral conveyors. But, as metal belts wear, black specks or worn-off bits of metal fall on the conveyed articles. In many food applications, black specks are not acceptable. In response to the black-speck problem and other food-contamination problems, modular plastic conveyor belts have begun replacing metal belts in food applications. In an ideal situation, a modular plastic belt is a drop-in replacement for a metal belt once the take-up, tensioning, and other sprockets are replaced. But, because metal belts have inherent beam stiffness, they are often supported from below only intermittently across their width, such as at their side edges and middle. This minimal support structure also allows for good air flow, but requires high beam stiffness from edge to edge. Plastic belts with a lot of open area for air flow and for the collapsibility required to negotiate turns, however, do not normally have much beam stiffness. This lack of beam stiffness causes conventional plastic conveyor belts to sag between the spaced apart supports. Another problem with some conventional modular plastic spiral belts with V-shaped links at the inside edge of the belt is that the amount of open area for air flow through the belt tends to decrease toward the inside edge of the belt as it collapses at the drive tower. And some modular plastic spiral belts have large knuckle links at the outside edge of the belt to bear all the belt pull in a turn. But a plastic hinge rod through the large link is subjected to high shear loads at only two points—one on each side of the large knuckle link. These high shear loads can break the hinge rod and cause the belt to come apart. Furthermore, in high-temperature applications, modular plastic conveyor belts can suffer some belt stretch and can, in rare circumstances, burn.

Consequently, there is a need for conveyor belts with increased beam stiffness for wide belt constructions, plenty of open area across its width, better distributed shear in the hinge rods, and heat resistance.

SUMMARY

These needs are satisfied by a conveyor belt module embodying features of the invention. The conveyor belt module comprises a spine having opposite first and second faces extending in a transverse direction of the module a distance defining substantially the width of the module between a first side edge and a second side edge. Hinge links extend outward from the first and second faces. The hinge links extending outward from the first face are transversely offset from the hinge links extending outward from the second face. The hinge links include a plurality of single links and a plurality of double links. The single links are disposed inwardly from the first side edge of the module and are transversely spaced along each face by a first transverse pitch. The dual links have a pair of parallel legs connected by a yoke at a distal end of the legs. The dual links are disposed inwardly from the second side edge of the module to the plurality of single links and are transversely spaced along each face by a second transverse pitch. The first transverse pitch is less than the second transverse pitch.

In another aspect of the invention, a modular conveyor belt comprises a plurality of rows of side-by-side belt modules. Each row includes a spine having opposite first and second faces extending in a transverse direction of the row perpendicular to a direction of belt travel a distance defining substantially the width of the row between a first side edge and a second side edge. Hinge links extend outward from the first and second faces. The hinge links extending outward from the first face are transversely offset from the hinge links extending outward from the second face. The hinge links include single links and dual links. The single links are disposed inwardly from the first side edge of the row and transversely spaced along each face by a first transverse pitch. The dual links have a pair of parallel legs connected by a yoke at a distal end of the legs. The dual links are disposed inwardly from the second side edge of the row to the plurality of single links and are transversely spaced along each face by a second transverse pitch, which is greater than the first transverse pitch. The hinge links extending from the first face of the spine of a row are hingedly interleaved with the hinge links extending from the second face of the spine of an adjacent row to form an endless modular conveyor belt capable of following a curved path with the first side edge at the outside of the curved path.

In yet another aspect of the invention, a method for making a conveyor belt module comprises molding a conveyor belt module out of a blend of a thermoplastic polymer resin and a nanoclay.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
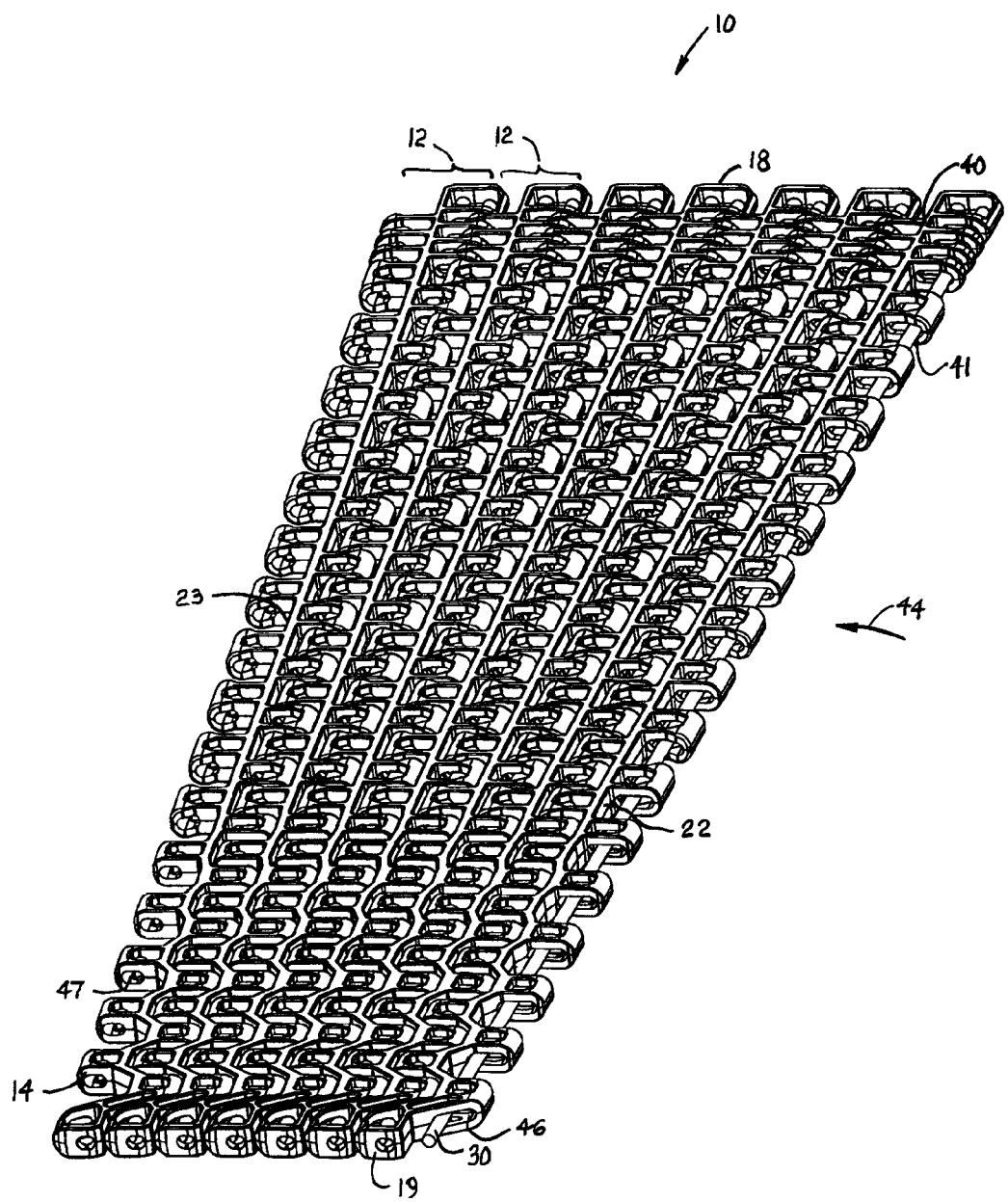
FIG. 1 is a perspective view of a portion of a modular conveyor belt embodying features of the invention.
Figure 2:
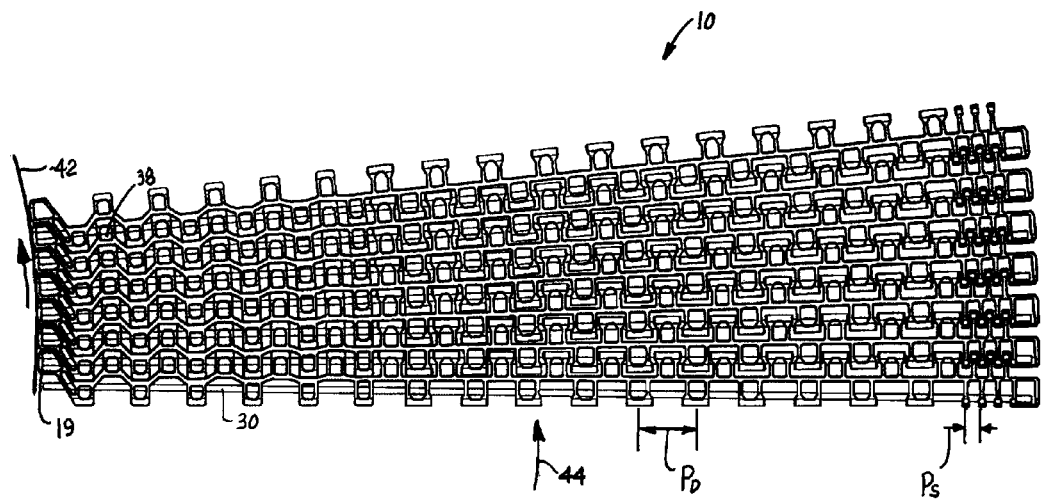
FIG. 2 is a top plan view of the conveyor belt of FIG. 1.
Figure 3:
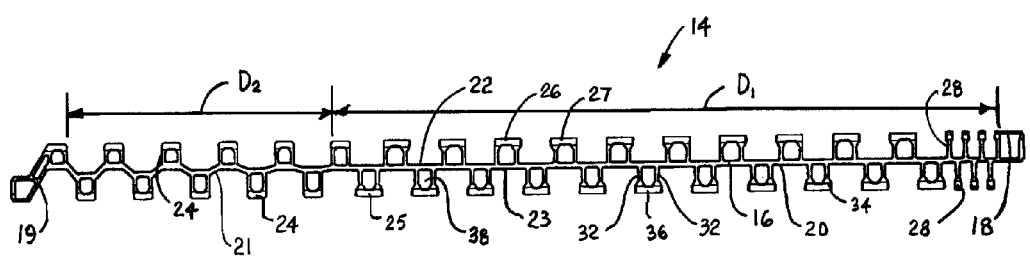
FIG. 3 is a bottom plan view of one module of the conveyor belt of FIG. 1.

A portion of a modular conveyor belt embodying features of the invention is shown in FIGS. 1 and 2. The belt 10 is constructed of a series of rows 12, each comprising a single belt module 14, like the belt module of FIG. 3. Each module includes a central transverse spine 16 extending substantially the width of the module between an outer side edge 18 and an inner side edge 19. The spine, which gives the module beam stiffness, has a linear portion 20 extending inward from the outer side edge a distance $D_1$ and a corrugated portion 21 extending inward of the module from the inner side edge a distance $D_2$. The degree of corrugation is greater at the inner side edge of the module to accommodate the collapse of the belt at the inside of a turn. The spine has opposite first and second faces 22, 23 from which hinge links 24, 25, 26, 27, 28 protrude. The hinge links extending outward from the first face are transversely offset from the hinge links extending outward from the second face so that the hinge links interleave with the hinge links of an adjacent module when connected together by a hinge rod 30 into a belt. Thus, the spine forms an intermediate portion of the module between the hinge links.

The hinge links are of two main kinds: a) single links 28; and b) dual links 24-27. All the dual links are characterized by a pair of parallel legs 32 extending outward from one of the spine's faces to distal ends 34 joined by a yoke 36. The yoke, the two legs, and the spine bound an opening 38 in the dual hinge link between top and bottom sides 40, 41 of the module. The openings provide the belt with a large amount of open area for air flow, and the transverse yokes add to the belt's beam stiffness. The dual links are positioned along the transverse width of the module transversely inward from the inner side edge 19 most of the distance to the outer side edge 18. The single hinge links 28, which have only one leg, are disposed between the outer side edge and the dual links. In this example, the number of dual hinge links is over five times the number of single links. All the single links and some of the dual links protrude from the spine's linear portion, which extends inward the distance $D_1$ from the outer side edge. The rest of the dual links protrude from the spine's corrugated portion, which extends the distance $D_2$ from the inner side edge to the linear portion. The distance $D_1$ is preferably greater than the distance $D_2$. The transverse pitch $P_D$ of the dual links in this example is about four times the pitch $P_S$ of the more closely spaced single links.

The conveyor belt 10, constructed of a series of the modules 14, is suitable for side-flexing about a curved conveying path, such as a helical path up or down a spiral-conveyor drive capstan 42 in a direction of belt travel 44. The belt shown can turn in only one direction, following a counterclockwise path, looking down on the spiral capstan. But the modules are reversible so that a belt can be made with the modules flipped top to bottom to follow a clockwise path. Slots 46 elongated in the direction of belt travel through the hinge links protruding from the trailing face 22 of the spine align with less elongated slots 47 protruding from the leading face 23 of a trailing module to form a transverse passageway for the hinge rod 30. The elongated slots and the corrugated portion of the spine allow the inner side edges 19 of the modules to collapse together near the periphery of the spiral capstan. The outer side edges 18 of the modules, which follow a longer path around the capstan, do not collapse and bear the majority of the belt tension. The tightly spaced single hinge links, in particular, are designed to carry a portion of the belt tension and distribute it along each hinge rod at multiple shear planes to increase the useful lives of the rods. And, as best shown in FIG. 2, the dual-link structure with its openings 38 minimizes the loss of open area as the inner side edge 19 of the belt collapses.

Figure 4A:
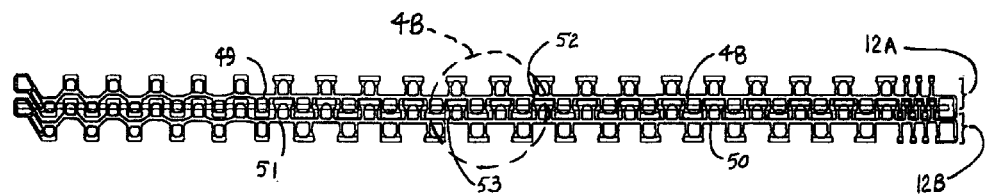
FIG. 4A is a top plan view of a portion of a bricklaid version of a conveyor belt as in FIG. 1.
Figure 4B:
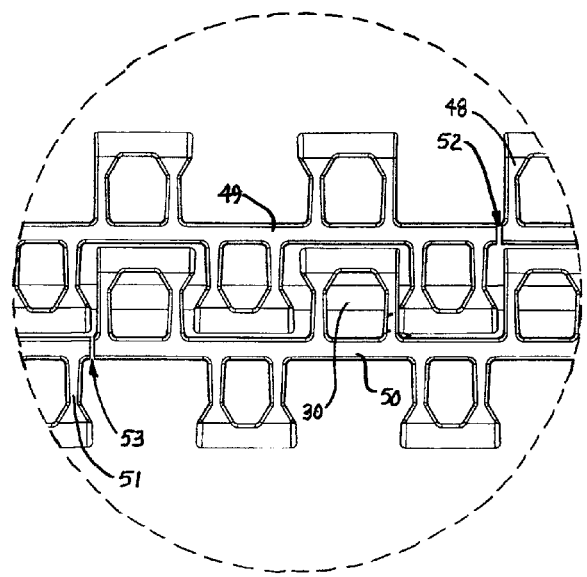
FIG. 4B is an enlarged view of a portion of the modules of FIG. 4A showing the seams between side-by-side modules.

The spiral belt shown in FIGS. 1 and 2 is constructed of a single wide module per belt row. But, as shown in FIGS. 4A and 4B, it is possible to construct each belt row out of more than one module. This is especially useful in the case of wide belts or belts of custom width. In this example, the two rows 12A and 12B of belt modules each consist of two modules. The row 12A has two modules: an outer side module 48 and an inner side module 49. The row 12B has a slightly longer outer side module 50 and a correspondingly shorter inner side module 51. The modules on each row are separated across gaps, or seams 52, 53, and interconnected by a hinge rod 30.

Preferably, the seams are not aligned but are offset transversely as shown. And, to minimize the loss of beam stiffness because of the seams, the alternating seams are preferably positioned on either side of belt-supporting wear strips. The supporting wearstrip is optimally set in the center of the bricklay module overlap.

Figure 5:
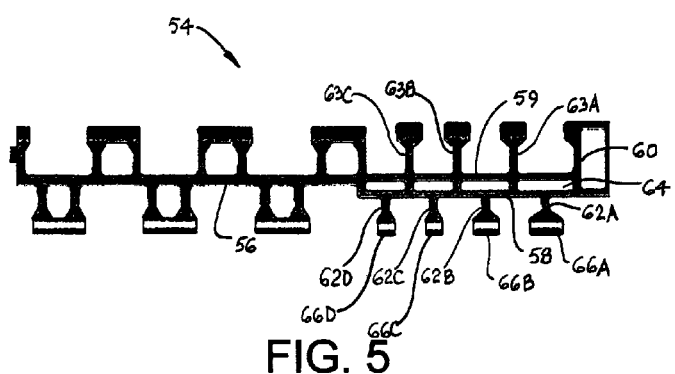
FIG. 5 is a top plan view of an alternative outside edge portion of a conveyor belt module usable in a conveyor as in FIG. 1.

FIG. 5 shows the outer side edge portion 54 of another version of a module usable in the conveyor as in FIG. 1. In this version, a central spine 56 comprises a pair of parallel bars 58, 59 that extend inwardly from an outer side edge 60 of the module. Short single links 62A-62D attach to a first bar 58. Long single links 63A-63C attach to both the first bar and the second bar 59 and define openings 64 bounded by the bars and the long links. The short links have heads 66A-66D of different widths. The transverse pitch decreases from the outer side edge of the belt inward. This provides greater flexibility of the bar 58 closer to the outer edge and progressively less flexibility of the bar farther from the outer edge. The width of the head decreases from the outside edge inward to fill the gap from the decreasing transverse pitch. Because the short links attach to the first bar 58 midway between the connection points of the two long hinge links, the first bar is able to bow outward somewhat under high-tension conditions. This gives the outer side edge of the belt more flexibility as it travels a curved path. The first bar 58 may be tapered in thickness—narrowest at the outer side edge of the belt—to provide even more flexibility where the tension is greatest.

The belt modules are preferably made of a thermoplastic polymer, such as polypropylene, polyethylene, acetal, or nylon, by an injection-molding process. In cases of exposure to open flames such as burning bread or welding drips or sparks, a material that resists ignition and burns slower and with less heat release when ignited is preferred. A material safe for food contact is also desired. A module molded out of a blend of nylon and a nanoclay resists heat without compromising the strength and durability of nylon. (A nanoclay is a layered silicate that may be modified organically to assist in its dispersion in other materials.) In heat tests, a sample of pure nylon released about three times as much heat in about 60% of the time as a sample made of a blend of about 95% by weight of BASF A3K nylon and 5% by weight of a modified nanoclay, alkyl quaternary ammonium bentonite, such as Cloisite 10A manufactured by Southern Clay Products, Inc. of Gonzales, Tex., U.S.A. In deflection tests, a one-foot long 30-inch wide belt made of the blend was compared with a similar one-foot long belt made of pure nylon. Each belt was supported 3 in inward of each side edge with an unsupported intermediate span of 24 in, which was weighted with a 2.5 lb/ft distributed load across the width of the span. After 24 hours, the downward deflection of the nylon-only belt at midspan was 0.198 in, and the deflection of the belt made with the nylon—nanoclay blend was 0.176 in. Thus, the belt modules made of the nylon—nanoclay blend had greater heat resistance and beam stiffness than the nylon-only modules. Other blends of thermoplastic polymers and modified or unmodified nanoclays may alternatively be used.

Figure 6:
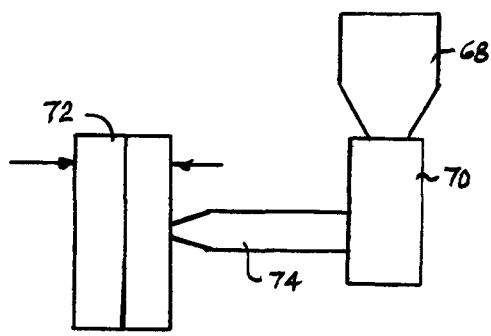
FIG. 6 is a pictorial representation of the molding of a conveyor belt module as in FIG. 3.

A process for molding the modules is shown in FIG. 6. The thermoplastic-nanoclay blend is fed from a hopper 68, melted in a heater 70, and injected into a two-piece mold 72 by one or more injectors 74. Each module is formed in the mold under pressure at elevated temperature.

What is claimed is:

1. A conveyor belt module comprising:
   a spine having opposite first and second faces extending in a transverse direction of the module a distance defining substantially the width of the module between a first side edge and a second side edge;

a plurality of hinge links extending outward from the first and second faces with the hinge links extending outward from the first face transversely offset from the hinge links extending outward from the second face;
wherein the plurality of hinge links includes:
a plurality of single links disposed inwardly from the first side edge of the module and transversely spaced along each face by a first transverse pitch;
a plurality of dual links having a pair of parallel legs connected by a yoke at a distal end of the legs, the dual links being disposed inwardly from the second side edge of the module to the plurality of single links and transversely spaced along each face by a second transverse pitch;
wherein the first transverse pitch is less than the second transverse pitch.

2. A conveyor belt module as in claim 1 wherein the second transverse pitch is about four times the first transverse pitch.

3. A conveyor belt module as in claim 1 wherein the spine is linear from the first side edge inward a first distance $D_1$ encompassing all the single links and some of the dual links and wherein the spine is corrugated from the second side edge inward a second distance $D_2$ encompassing the rest of the dual links.

4. A conveyor belt module as in claim 3 wherein $D_1 > D_2$.

5. A conveyor belt module as in claim 1 wherein the spine comprises a pair of parallel bars extending transversely inward from the first side a distance encompassing all the single links.

6. A conveyor belt module as in claim 1 wherein the number of dual links is greater than the number of single links.

7. A conveyor belt module as in claim 6 wherein the number of dual links is over five times the number of single links.

8. A conveyor belt module as in claim 1 wherein the module is made of a blend of a polymeric material and a nanoclay material.

9. A conveyor belt module as in claim 8 wherein the nanoclay material includes alkyl quaternary ammonium bentonite.

10. A conveyor belt module as in claim 8 wherein the nanoclay material constitutes about 5% of the weight of the blend.

11. A modular conveyor belt comprising:
a plurality of rows of side-by-side belt modules, each row including:
a spine having opposite first and second faces extending in a transverse direction of the row perpendicular to a direction of belt travel a distance defining substantially the width of the row between a first side edge and a second side edge;
a plurality of hinge links extending outward from the first and second faces with the hinge links extending outward from the first face transversely offset from the hinge links extending outward from the second face;
wherein the plurality of hinge links includes:
a plurality of single links disposed inwardly from the first side edge of the row and transversely spaced along each face by a first transverse pitch;
a plurality of dual links having a pair of parallel legs connected by a yoke at a distal end of the legs, the dual links being disposed inwardly from the second side edge of the row to the plurality of single links and transversely spaced along each face by a second transverse pitch greater than the first transverse pitch;
wherein the hinge links extending from the first face of the spine of a row are hingedly interleaved with the hinge links extending from the second face of the spine of an adjacent row to form an endless modular conveyor belt capable of following a curved path with the first side edge at the outside of the curved path.

12. A conveyor belt as in claim 11 wherein the second transverse pitch is about four times the first transverse pitch.

13. A conveyor belt as in claim 11 wherein the spine is linear from the first side edge inward a first distance $D_1$ encompassing all the single links and some of the dual links and wherein the spine is corrugated from the second side inward a second distance $D_2$ encompassing the rest of the dual links.

14. A conveyor belt as in claim 13 wherein $D_1 > D_2$.

15. A conveyor belt as in claim 11 wherein the spine comprises a pair of parallel bars extending transversely inward from the first side a distance encompassing all the single links.

16. A conveyor belt as in claim 11 wherein the number of dual links is greater than the number of single links.

17. A conveyor belt as in claim 16 wherein the number of dual links is over five times the number of single links.

18. A conveyor belt as in claim 11 wherein the belt modules are made of a blend of a thermoplastic polymer resin and a nanoclay.

19. A conveyor belt as in claim 18 wherein the nanoclay includes alkyl quaternary ammonium bentonite.

20. A conveyor belt as in claim 18 wherein the thermoplastic polymer resin comprises nylon.

* * * * *